US005362564A

United States Patent [19]

Suzuki et al.

[11] Patent Number: 5,362,564

[45] Date of Patent: Nov. 8, 1994

[54] SEAMLESS CAPSULE COMPRISING A LOWER FATTY ESTER OF SUCROSE

[75] Inventors: Toshiyuki Suzuki, Itami; Ryousei Kamaguchi, Osaka, both of Japan

[73] Assignee: Morishita Jintan Co., Ltd., Osaka, Japan

[21] Appl. No.: 846,949

[22] Filed: Mar. 6, 1992

[51] Int. Cl.[5] .......................... B32B 5/16; B32B 9/02

[52] U.S. Cl. ................................ 428/402.2; 424/455; 424/456; 428/402.21

[58] Field of Search ........................ 428/402.2, 402.21; 424/455, 456

[56] References Cited

U.S. PATENT DOCUMENTS 3,664,963 5/1972 Pasin ................................ 428/402.2
4,428,983 1/1984 Nehen et al. .................. 428/402.21
4,532,123 7/1985 Gardner ......................... 428/402.21
5,093,200 3/1992 Watanabe et al. ............... 428/402.2

*Primary Examiner*—D. S. Nakarani
*Attorney, Agent, or Firm*—Oblon, Spivak, McClelland, Maier & Neustadt

[57] ABSTRACT

A seamless capsule comprising a content and a film for coating said content is disclosed. The content is an hydrophilic substance. A lower fatty acid ester of sucrose is present between the content and the film. There is also disclosed a process for producing a seamless capsule which comprises simultaneously extruding a hydrophilic substance solution, a lower fatty acid ester of sucrose and a film solution for the seamless capsule into a cooling solution from concentrically arranged nozzles, a first nozzle, a second nozzle and a third nozzle, respectively, the diameter of said nozzle gradually increasing in that order.

5 Claims, 1 Drawing Sheet

SEAMLESS CAPSULE COMPRISING A LOWER FATTY ESTER OF SUCROSE

FIELD OF THE INVENTION

The present invention relates to a seamless capsule containing an hydrophilic substance as a content, and a process for producing the same.

BACKGROUND OF THE INVENTION

Seamless capsules containing medicaments, flavors, vegetable oils, etc. as a content have hitherto been used for various applications.

However, these substances which can be encapsuled are specifically limited, and only substances having no moisture absorption characteristics or finely-powdered substances having oil solubility have been encapsuled. Substances (including an aqueous solution) having strong hydrophilic nature are not actually encapsulated even if they are substances which should be desirably encapsulated. If such a substance having strong hydrophilic nature is encapsulated, the water content absorbed in the substance itself transfers to the surface of a capsule to dissolve or soften a soft capsule. Further, even if the water content adhered to the substance itself is removed, the capsule is softened by the water content which permeates through it and, therefore, encapsulation can not be conducted.

In Japanese Patent Kokai No. 60-172343, there is disclosed a method comprising coating a nucleus ingredient with a film substance (e.g. hydrogenated oil, etc.), and then spray-coating its surface with the film substance. The hydrophilic substance can also be seamless-encapsulated according to this method, however, there is a production problem that the hydrogenated oil is solidified in a nozzle. Further, there is also a design problem that the resulting capsule shows a color of the hydrogenated oil solidified.

OBJECTS OF THE INVENTION

One object of the present invention is to provide an excellent seamless encapsulating method of a hydrophilic substance (including an aqueous solution).

Another object of the present invention is to provide a seamless capsule having high commercial value.

This object as well as other objects and advantages of the present invention will become apparent to those skilled in the art from the following description with reference to the accompanying drawings.

SUMMARY OF THE INVENTION

Figure 1:
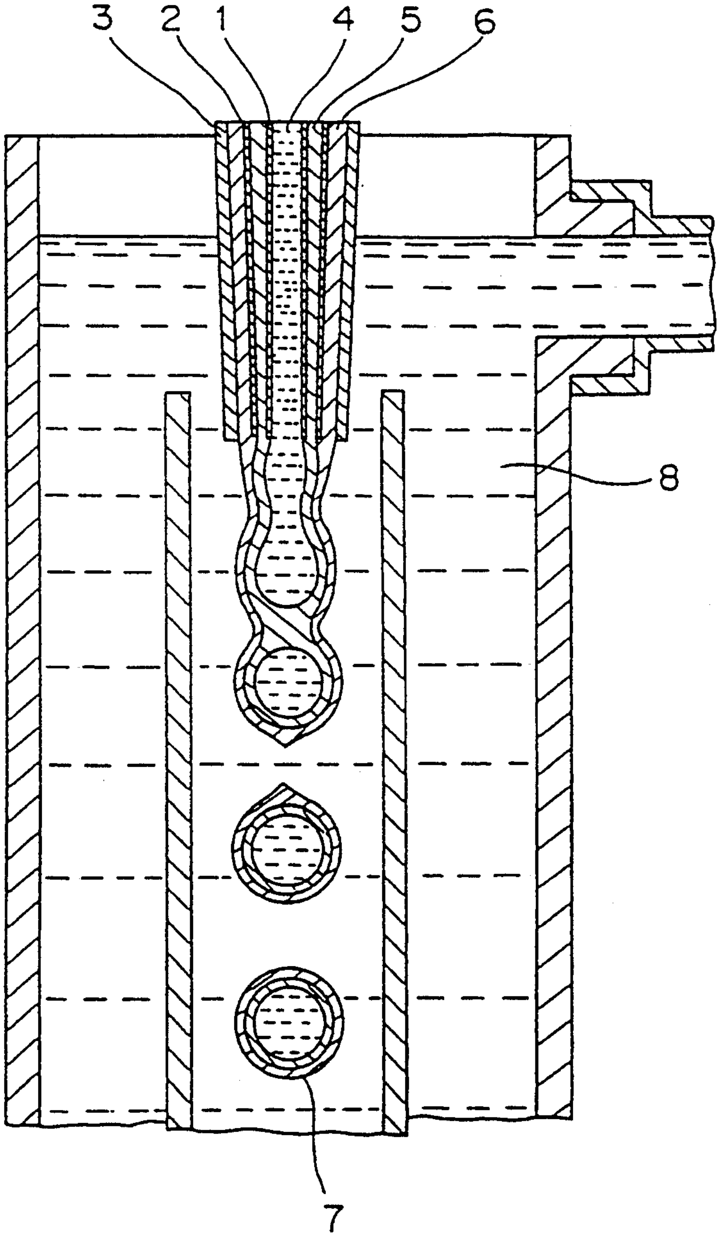
FIG. 1 is a schematic cross section illustrating one embodiment of the nozzle part of an apparatus which is suitable for producing the seamless capsule of the present invention.

According to the present invention, there is provided:

(1) A seamless capsule which comprises a content and a film for coating said content, said content being an hydrophilic substance, and a lower fatty acid ester of sucrose being present between said content and said film; and (2) A process for producing a seamless capsule which comprises simultaneously extruding an hydrophilic substance solution (solution I) a lower fatty acid ester of sucrose (solution II) and a film solution for the seamless capsule (solution III) into a cooling solution from concentrically arranged nozzles, a first nozzle, a second nozzle and a third nozzle, respectively, the diameter of said nozzle gradually increasing in that order.

DETAILED DESCRIPTION OF THE INVENTION

In the present invention, the content which can be seamless-encapsulated is not limited to a specific one and can be anyone which can become a liquid under heating and is ejected from a nozzle. The process of the present invention can be effectively applied for that which is a liquid at a normal temperature and has hydrophilic nature. The typical content is not limited to a specific one and examples thereof include various pharmaceutical solutions, foods, cosmetics, flavors, industrial chemicals and the like.

The film substance of the seamless capsule used in the present invention is not specifically limited and suitable one can be obtained by subjecting (a) gelatin, and, optionally (b) water-soluble polyhydric alcohol or water-soluble derivative thereof to a gelation treatment. Gelatin, or the water-soluble polyhydric alcohol or water-soluble derivative thereof having the same grade as that of which is used for producing a conventional capsule may be employed as it is.

The water-soluble polyhydric alcohol or water-soluble derivative thereof is not specifically limited and examples thereof include glycerin, polyglycerin, sorbitol, ethylene glycol, polyethylene glycol, propylene glycol, polypropylene glycol, ethylene oxide-propylene oxide copolymer, oligosaccharide, sugar ester, glyceride, sorbitan ester and the like.

The amount of gelatin to be used is normally 50 to 90% by weight based on the total weight of the capsule film. Further, the amount of the water-soluble polyhydric alcohol or water-soluble derivative thereof is 10 to 30% by weight, preferably 15 to 25% by weight based on the total weight of the capsule film.

In the seamless capsule of the present invention, a low fatty acid of sucrose is present between the above-described film and content which is the hydrophilic substance. The lower fatty acid ester of sucrose is a compound having a hydrophilic and lipophilic group, which has an action similar to that of a surfactant, and it is generally compatible with the above-described hydrophilic substance and film substance. Examples of the lower fatty acid, which esterifies sucrose, include a fatty acid having 2 to 6 carbon atoms (e.g. acetic acid, butyric acid, caproic acid, etc.). The suitable lower fatty acid ester of sucrose is SAIB (sucrose acetate isobutylate) which is commercially available from Eastman Chemical Products, Inc.

FIG. 1 illustrates one embodiment of the nozzle part of an apparatus which is suitable for producing the seamless capsule of the present invention.

A capsule content 4 which is supplied into a nozzle part is extruded from an inner nozzle (first nozzle) and a lower fatty acid ester of sucrose 5 is extruded from an annular pore tip part of an intermediate nozzle (second nozzle) 2 and, at the same time, a film solution for a seamless capsule 6 is extruded from an annular pore tip part of an outer nozzle (third nozzle) 3, and then a three-phase composite jet thus obtained is ejected into a cooling solution 8 to obtain a seamless capsule 7 of the present invention.

In this case, when the content jet 3 is a two-phase jet, a triplex soft capsule is obtained and, when it is a three-phase jet, a quadruplex soft capsule is obtained. Similarly, a desired multiplex soft capsule is produced.

The filler is liquid and, therefore, by providing a suitable vibration to the composite jet flow using a vibration means, dropping of the jet flow may be improved, whereby, encapsulation is easily conducted, which results in uniform particle size.

The seamless capsule thus produced as described above may be dried as it is and then washed.

According to the present invention, a seamless capsule containing an hydrophilic substance, particularly an aqueous solution as a content can be easily obtained by a dropping method. A lower fatty acid ester of sucrose protects the hydrophilic substance to avoid contacting it with the film. Since the fatty acid ester of sucrose is transparent at a normal temperature, it is extremely easy to design a color of the seamless capsule.

The following Examples further illustrate the present invention in detail but are not to be construed to limit the scope thereof.

EXAMPLE 1

By using water (100% ) as a solution I, a capsule of 4.2 mm $\phi$ was produced.

| | (Formulation 1) | |
|---|---|---|
| Ingredients | Amount (% by weight) | Ratio (%) |
| Solution I: | | |
| Water (100%) | 100 | 70 |
| Solution II: | | |
| Sucrose fatty acid ester (SAIB) | 100 | 20 |
| Solution III: | | |
| Gelatin | 20 | |
| D-sorbitol | 5 | 10 |
| Water | 75 | |

By using a concentric triplex nozzle, water (100%) (solution I) was extruded from an inner nozzle and a SAIB solution (solution II) heated to 80° C. was extruded from an intermediate nozzle and, at the same time, a gelatin solution (solution III) was extruded from an outer nozzle to form a three-phase jet in a ratio as shown in Formulation 1, and then the jet was injected into a vegetable oil cooled to 12° C., which was descending at a flow rate of 0.18 m/second, to obtain a seamless capsule. Regarding the capsule thus obtained, the solution I was not volatilized during drying. Further, no softening, liquid spill, deformation and the like were observed. The capsule was transparent and had good mouth feel and taste.

EXAMPLE 2

By using liqueur as a solution I, a liqueur capsule of 3.2 mm $\phi$ was produced.

| | (Formulation 2) | |
|---|---|---|
| Ingredients | Amount (% by weight) | Ratio (%) |
| Solution I: | | |
| Liqueur (alcohol content: 30%) | 100 | 70 |
| Solution II: | | |
| Sucrose fatty acid ester (SAIB) | 100 | 20 |
| Solution III: | | |
| Gelatin | 20 | |
| D-sorbitol | 5 | 10 |
| Water | 75 | |

According to the same preparation condition as that described in Example 1, a three-phase jet was formed, and then the jet was injected into a vegetable oil cooled to 12° C., which was descending at a flow rate of 0.30 m/second, to obtain a seamless capsule.

Regarding the capsule thus obtained, the solution I was not volatilized during drying. Further, no softening, liquid spill, deformation and the like were observed. A transparent liqueur capsule having good mouth feel could be produced.

EXAMPLE 3

By using an concentrated orange juice as a solution I, a juice capsule of 4.2 mm $\phi$ was produced.

| | (Formulation 3) | |
|---|---|---|
| Ingredients | Amount (% by weight) | Ratio (%) |
| Solution I: | | |
| Conc. orange juice | 100 | 70 |
| Solution II: | | |
| Sucrose fatty acid ester (SAID) | 100 | 20 |
| Solution III: | | |
| Gelatin | 20 | |
| D-sorbitol | 5 | 10 |
| Water | 75 | |

According to the same preparation condition as that described in Example 1, a three-phase jet was formed, and then the jet was injected into a vegetable oil cooled to 12° C., which was descending at a flow rate of 0.18 m/second, to obtain a seamless capsule.

Regarding the capsule thus obtained, the solution I was not volatilized during drying. Further, no softening, liquid spill, deformation and the like were observed. A transparent orange juice capsule having good mouth feel and acidity could be produced.

What is claimed is:

1. A seamless capsule comprising a content, a film coating said content, and a $C_2$–$C_6$ fatty ester of sucrose, said fatty acid ester of sucrose being present between said content and said film, said content being a hydrophilic substance which becomes a liquid under heating, said film being obtained by gelling gelatin alone or in combination with a water-soluble polyhydric alcohol.

2. A seamless capsule consisting essentially of a content, a film coating said content, and a $C_2$–$C_6$ fatty acid ester of sucrose, said fatty acid ester of sucrose being present between said content and said film, said content being a hydrophilic substance which becomes a liquid under heating, said film being obtained by gelling a mixture of gelatin and a water-soluble polyhydric alcohol.

3. The seamless capsule according to claim 1 wherein the water-soluble polyhydric alcohol is selected from the group consisting of glycerin, polyglycerin, sorbitol, ethylene glycol, polyethylene glycol, propylene glycol, polypropylene glycol, ethylene oxide-propylene oxide copolymer, oligosaccharide, a sugar ester, a glyceride and sorbitan ester.

4. The seamless capsule according to claim 2, wherein said film contains 80% by weight gelatin and 20% by weight of a water-soluble polyhydric alcohol based on the total weight of the film.

5. The seamless capsule according to claim 4, wherein said water-soluble polyhydric alcohol is D-sorbitol.

* * * * *